(12) United States Patent
Sivertsen (10) Patent No.: US 10,078,371 B1
(45) Date of Patent: Sep. 18, 2018

(54) TOUCHLESS CONTROLLER WITH CONFIGURABLE OUTPUT PINS

(71) Applicant: American Megatrends, Inc., Norcross, GA (US)

(72) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 127 days.

(21) Appl. No.: 13/708,757

(22) Filed: Dec. 7, 2012

(51) Int. Cl.
*G09G 5/00* (2006.01)
*G06F 3/041* (2006.01)
*G06F 3/01* (2006.01)
*G06F 3/038* (2013.01)

(52) U.S. Cl.
CPC .............. *G06F 3/017* (2013.01); *G06F 3/038* (2013.01)

(58) Field of Classification Search
CPC ................................. G06F 3/018; G06F 3/017
USPC ........................................................ 345/173
See application file for complete search history.

(56) References Cited

U.S. PATENT DOCUMENTS

| 7,282,927 | B1 | 10/2007 | Burkatovsky | |
|---|---|---|---|---|
| 2002/0080112 | A1* | 6/2002 | Braun et al. ................. | 345/156 |
| 2005/0024325 | A1* | 2/2005 | Fleischmann et al. ....... | 345/156 |
| 2005/0065618 | A1 | 3/2005 | Burkatovsky | |
| 2006/0010400 | A1* | 1/2006 | Dehlin et al. ................. | 715/856 |
| 2007/0262963 | A1 | 11/2007 | Xiao-Ping et al. | |
| 2008/0006454 | A1 | 1/2008 | Hotelling | |
| 2008/0007533 | A1 | 1/2008 | Hotelling | |
| 2008/0100572 | A1* | 5/2008 | Boillot ................... | G06F 1/1632 345/158 |
| 2008/0297487 | A1* | 12/2008 | Hotelling et al. ............ | 345/173 |
| 2010/0245286 | A1 | 9/2010 | Parker | |
| 2010/0295781 | A1* | 11/2010 | Alameh .................. | G06F 3/017 345/158 |
| 2010/0312366 | A1 | 12/2010 | Madonna et al. | |
| 2011/0254864 | A1* | 10/2011 | Tsuchikawa .......... | G06F 3/0416 345/660 |
| 2012/0026123 | A1 | 2/2012 | Grunthaner et al. | |
| 2012/0068964 | A1* | 3/2012 | Wright et al. ................ | 345/174 |
| 2012/0235938 | A1 | 9/2012 | Laubach | |

(Continued)

OTHER PUBLICATIONS

Wiki (Wiki page on "one-hot", dated on Sep. 20, 2012, attached here as Wiki.pdf, available at url: https://web.archive.org/web/20120920012340/http://en.wikipedia.org/wiki/One-hot).*

(Continued)

*Primary Examiner* — Kwin Xie
(74) *Attorney, Agent, or Firm* — Newport IP, LLC; Shigeta Hope (57) ABSTRACT

A touchless controller includes output pins corresponding to detected touchless gestures. The touchless controller may include a memory that stores a gesture table that associates gestures respectively with the output pins, a proximity sensor that detects the presence of a target in proximity thereto and generates a corresponding detection signal, a gesture recognition unit, and an output controller. The gesture recognition unit is configured to determine the gesture that the detection signal corresponds to. The output controller is configured to determine the output pin that the determined gesture corresponds to by referencing the gesture table stored in the memory. The output controller then controls the state of the output pin according to the determined gesture.

20 Claims, 4 Drawing Sheets

(56) References Cited

U.S. PATENT DOCUMENTS

2013/0033418 A1* 2/2013 Bevilacqua et al. .......... 345/156
2013/0222275 A1 8/2013 Byrd et al.

OTHER PUBLICATIONS

Xilinx (app note xapp881.pdf dated Jul. 25, 2010 is attached).*
Xilinx Virtex-6 ug361, from url: http://www.datasheetarchive.com/dl/Datasheet-073/DSA00388686.pdf. Selected page of this document is attached as ug361_selected_page .pdf.*
Semtech ("Selection Guide", downloaded from http://www.semtech.com/images/mediacenter/collateral/touchsg.pdf, saved as semtech.pdf, published on Jul. 10, 2012.*
"CapSense® Express", Cypress Semiconductor [online][retrieved on Nov. 3, 2012] retrieved from: http://www.cypress.com/?id=3233 , 2 pps.
Baetoniu, C. "Virtex-6 FPGA LVDS 4X Asynchronous Oversampling at 1.25 Gb/s" published by Xilinx Jul. 25, 2010 [online][retrieved on Jun. 19, 2014] retrieved from: http://www.xilinx.com/support/documentation/application_notes/xapp881_V6_4X_Asynch_OverSampling.pdf, 13 pps.
Web Article: "One-hot" published by Wikipedia [online][retrieved on Jun. 19, 2014] retrieved from: https://web.archive.org/web/20120920012340/http://en.wikipedia.org/wiki/One-hot , 1 page.
U.S. Official Action dated Jun. 16, 2014 in U.S. Appl. No. 13/708,740, filed Dec. 7, 2012, First named inventor: Sivertsen.
U.S. Official Action dated Dec. 19, 2014 in U.S. Appl. No. 13/708,740, filed Dec. 7, 2012, First Named Inventor: Sivertsen.
Office Action for U.S. Appl. No. 13/708,740, dated Jul. 27, 2015, Clas G. Silvertsten, "Touch Controller with Configurable Output Pins Corresponding to Gestures", 14 pages.
Semtech, Selection Guide, retrieved on unknown, at <<http://www.semtech.com/images/mediacenter/collateral/touchsg.pdf>>, 2012, pp. 1-16.
Office action for U.S. Appl. No. 13/708,740, dated Jun. 8, 2016, Sivertsen, "Touch Controller with Configurable Output Pins Corresponding to Gestures", 14 pages.
Office action for U.S. Appl. No. 13/708,740, dated Dec. 21, 2016, Sivertsen, "Touch Controller with Configurable Output Pins Corresponding to Gestures", 15 pages.
Office action for U.S. Appl. No. 13/708,740, dated May 3, 2017, Sivertsen, "Touch Controller with Configurable Output Pins Corresponding to Gestures", 15 pages.

* cited by examiner

| Number of Rx | | 1x | 2x | 3x | 4x |
|---|---|---|---|---|---|
| Mode | Slider | 2 | 3 | 4 | 4 |
| | Triangle | 3 | x | 3 | x |
| | Square | 4 | 4 | x | 4 |
| | Independent | 1 | 2 | 3 | 4 |

TOUCHLESS CONTROLLER WITH CONFIGURABLE OUTPUT PINS

BACKGROUND

Many mechanical buttons and switches are being replaced by electronic buttons and switches that have no moving parts. For example, the mechanical call buttons typically used in elevators to choose a destination floor have been replaced with touch-sensitive buttons based on, for example, capacitive sensing technologies. With such capacitive buttons, users can lightly tap the buttons, instead of having to press on them with a sufficient force to move the outside casing portions of the buttons. Moreover, a sleeker and more modern appearance may be realized using capacitive buttons.

While such capacitive buttons and the control devices used therewith perform their intended function, the user is nevertheless limited to performing a pushing operation to activate the capacitive buttons, and more complicated input by the user is not possible. Moreover, when using mechanical or capacitive buttons to control a large number of devices, that is, when it is desired to have a large number of outputs, there must be provided a number of buttons equal to the number of outputs desired. This can make the control area appear unorganized and complicated.

Another drawback of typical mechanical and capacitive buttons is that physical contact with such buttons can be unsanitary and lead to the transmission of germs. In some environments touching a mechanical or capacitive button is not desirable, such as in environments where maintaining a clean and sterile environment is desirable, such as in restrooms or in surgical areas.

It is with respect to these and other considerations that the disclosure presented herein has been made.

SUMMARY

A touchless controller with configurable output pins is disclosed herein. The touchless controller provides functionality for detecting the presence of a target, such as a hand or other body part making a gesture without touching a surface. The controller also includes functionality for detecting gestures and controlling the status of one or more output pins based upon the detected gesture. The output provided by the output pin might then be utilized to perform a function, such as controlling an elevator for instance. In this way, touchless gestures can be detected and utilized to control various types of functionality.

In one embodiment, a touchless controller is provided that includes output pins, a memory storing a gesture table that associates detected touchless gestures with the output pins, a proximity sensor that detects presence of a target in proximity thereto and generates a corresponding detection signal, a gesture recognition unit configured to determine the gesture that the signal corresponds to, and an output controller configured to determine an output pin that the determined gesture corresponds to by referencing the gesture table stored in the memory. The output controller controls the state of the output pin corresponding to the determined gesture.

In another exemplary embodiment, a method for operating a touchless controller is provided. The method includes detecting the presence of a target in proximity to a proximity sensor of the touchless controller and generating a corresponding detection signal, identifying a gesture that the detection signal corresponds to, determining an output pin that the determined gesture corresponds to by referencing a gesture table stored in a memory of the touchless controller, and controlling a state of an output pin corresponding to the determined gesture.

Yet another exemplary embodiment provides a computer-readable storage medium. The computer-readable storage medium according to this embodiment may have computer-readable instructions stored thereupon which, when executed by a computer, cause the computer to detect the presence of a target in proximity to a proximity sensor of the touchless controller and generate a corresponding detection signal, determine a gesture that the detection signal corresponds to, determine an output pin of a touchless controller that the determined gesture corresponds to by referencing a gesture table stored in a memory of the touchless controller, and control a state of the output pin corresponding to the determined gesture.

The subject matter described herein might also be implemented as a computer-implemented method, in a computing system, as an apparatus, or as an article of manufacture such as a computer-readable storage medium. These and various other features as well as advantages will be apparent from a reading of the following detailed description and a review of the associated drawings.

DETAILED DESCRIPTION

A controller is disclosed herein that is configured to detect touchless gestures and to set the state of one or more output pins on the controller based upon the detected touchless gesture. As used herein, the term "touchless gesture" refers to the performance of a physical movement that corresponds to a command without touching a surface (i.e. in free space). In the following detailed description, references are made to the accompanying drawings that form a part hereof, and in which are shown by way of illustration specific embodiments or examples. Referring now to the drawings, in which like numerals represent like elements through the several figures, aspects of a controller with output pins corresponding to touchless gestures will be described.

Figure 1:
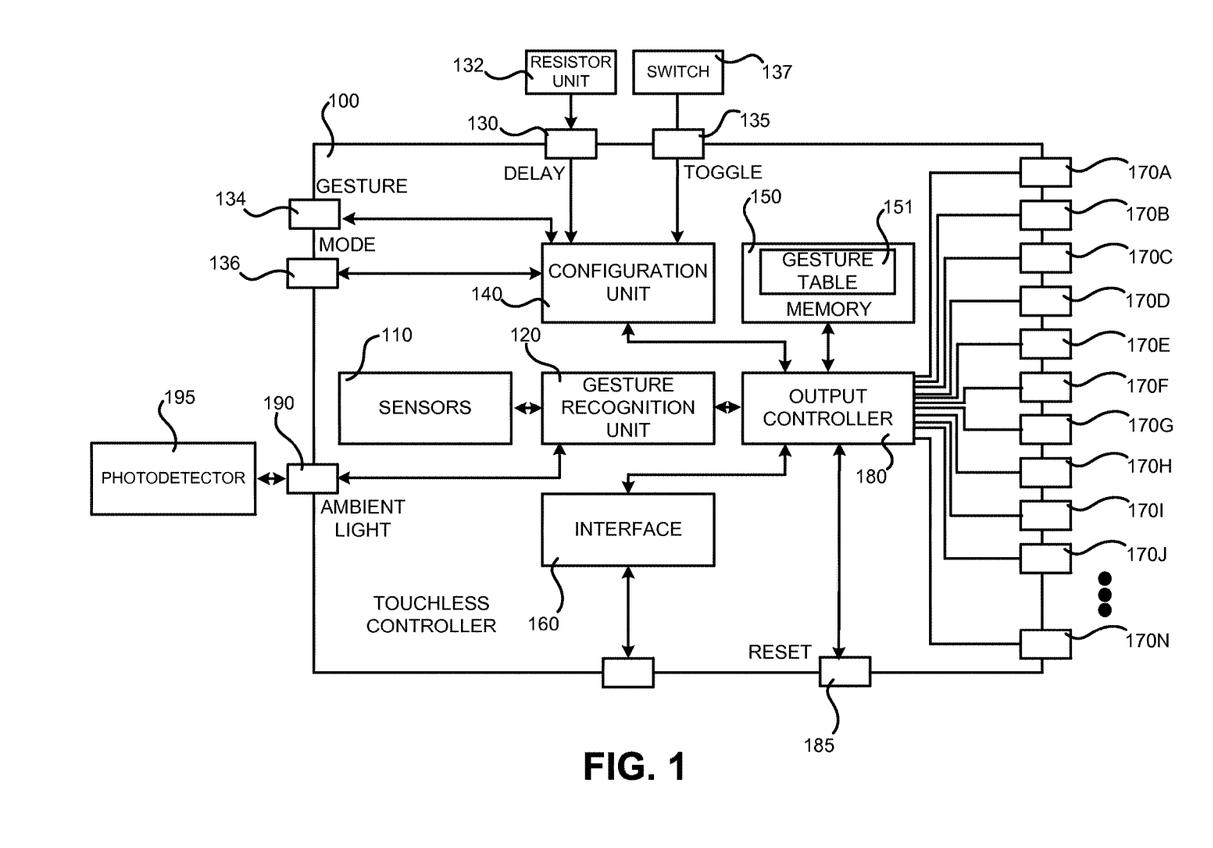
FIG. 1 is a block diagram illustrating one embodiment of a touchless controller with configurable output pins according to one embodiment disclosed herein.

FIG. 1 is a block diagram illustrating one embodiment of a controller 100 (referred to herein as a "touchless controller 100" or simply a "controller 100")) having configurable output pins 170A-170N corresponding to touchless gestures, according to one embodiment disclosed herein. In one implementation, the touchless controller 100 includes one or more sensors 110, a gesture recognition unit 120, a delay pin 130, a toggle pin 135, a gesture pin 134, a mode pin 136, a configuration unit 140, a memory 150, an output controller 180, an interface 160, and a plurality of output pins 170A-170N (the output pins may be referred to individually as an "output pin 170" or collectively as the "output pins 170"). Details regarding each of these components will be provided below. It should be appreciated that the controller 100 might also include other components and circuitry, for instance for distributing power to the components described above, that are not shown in FIG. 1.

Figure 2:
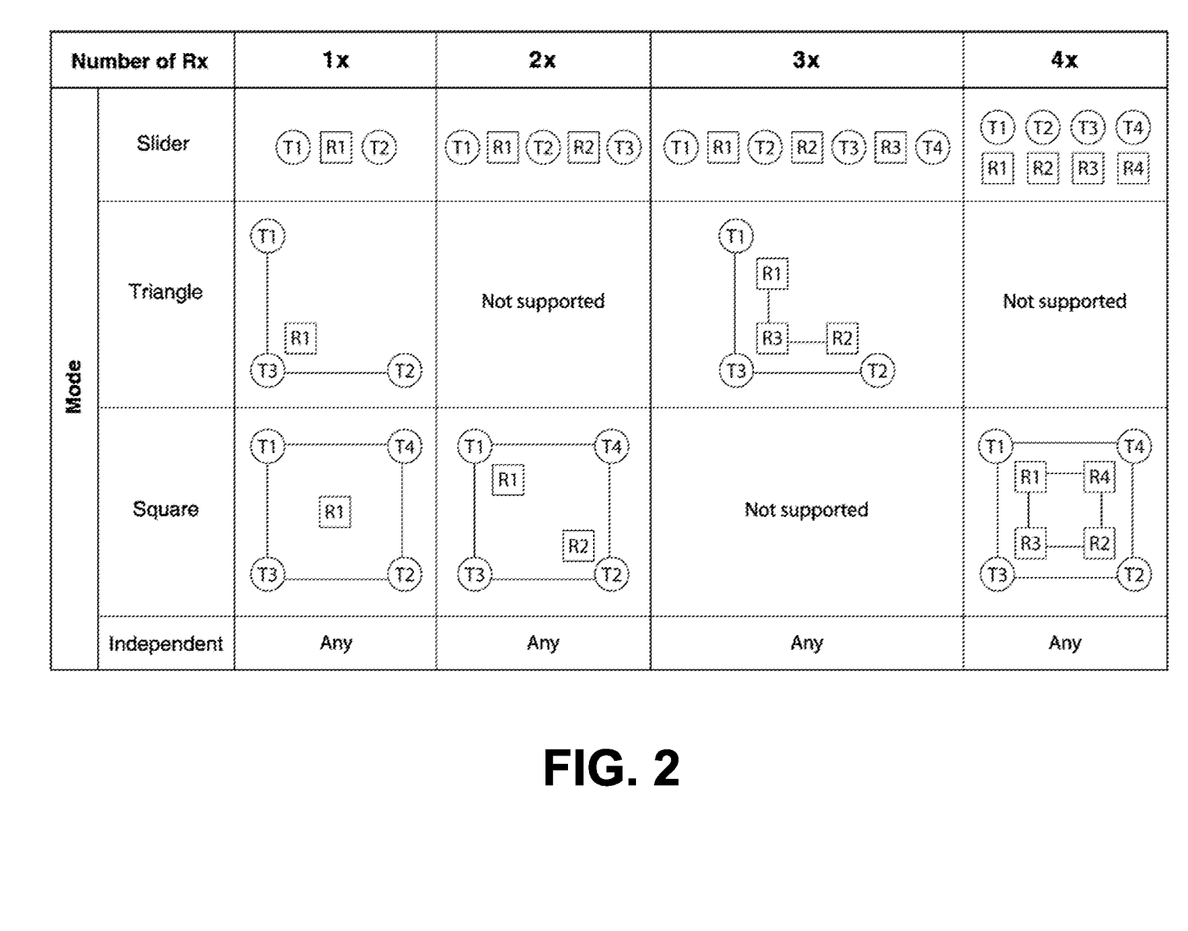
FIG. 2 is a table illustrating various possible modes for transmitters and receivers configured according to one embodiment disclosed herein.

The sensors 110 may include proximity sensors that detect the presence of a target and generate detection signals in response. The sensors might be integrated with or external to the touchless controller 100. In one example, for instance, the sensors 110 are one or more infrared ("IR") transmitters and receivers sensors configured in various arrangements to allow for proximity presence detection, proximity sliding detection, proximity gesture detection, and other types of touchless gestures. More specifically, FIG. 2 shows several configurations of IR transmitters and IR receivers (in FIG. 2, "T" denotes an IR transmitter and "R" denotes an IR receiver). In FIG. 2, the slider, triangle, and square modes are sub-modes within a combination mode in which detection signals from IR receivers are used in combination. Also, in FIG. 2, the independent mode refers to a mode in which detection signals generated by each IR receiver are interpreted independently. The different modes will be described in greater detail below.

It should be appreciated that different types of sensors may be used to detect touchless gestures and the disclosure presented herein is not limited to IR sensors as described above. For example, the sensors 110 may include capacitive, Doppler effect, eddy-current, radar, sonar, ultrasonic, hall-effect, inductive, or other sensors capable of detecting a gesture that does not involve touching a surface.

The gesture recognition unit 120 is coupled to the sensors 110 in one embodiment. The gesture recognition unit 120 receives detection signals generated from the sensors 110. Based upon the received signals, the gesture recognition unit 120 can determine the presence of a target in proximity to the sensors 110, movement of the target, and possibly also different proximities or changes in the proximity of the target.

In some embodiments, the delay pin 130 and the toggle pin 135 may be manipulated by a user to set different configurations for the output pins 170. More specifically, the delay pin 130 may be set by a user to designate a delay setting indicating a duration that the output pins 170 are to be held high (or low depending upon the configuration). The toggle pin 135 may be set by a user to designate a toggle setting indicating whether the output pins 170 should be toggled or maintained in a particular state in response to detecting a touchless gesture.

In some embodiments, the touchless controller 100 also includes a resistor unit 132, which is coupled to the delay pin 130 and which may be varied in resistance value by a user to designate a delay setting. In some embodiments, the resistor unit 132 comprises a potentiometer, and the user may operate a knob connected to a shaft of the potentiometer to vary the resistance value of the resistor unit 132. In other embodiments, the resistor unit 132 is one or more resistors formed in a voltage divider circuit. In this case, a user may choose the values of the resistors in the voltage divider circuit to vary the resistance value of the resistor unit 132. In yet other embodiments, the resistor unit 132 is a single resistor, and the user may choose the value of the resistor to vary the resistance value of the resistor unit 132 and thereby vary the delay setting described above.

In some embodiments, the touchless controller 100 also includes a switch 137 coupled to the toggle pin 135. The switch 137 may be turned on and off (i.e., pulled high or low) by a user to designate the toggle setting discussed above. In some embodiments, when the toggle setting is set to on, the output pins 170 are toggled (i.e., turned from off to on or from on to off) by control of the output controller 180. In some embodiments, when the toggle setting is set to on, the delay setting described above is disabled.

The gesture pin 134 may be manipulated by a user to place the sensors 110 in an independent mode or in a combination mode. For example, a switch (not shown in FIG. 1) may be connected to the gesture pin 134 to facilitate such control by the user. As described briefly above, in the independent mode the detection signals obtained from the sensors 110 are used independently, while in the combination mode, the detection signals obtained from the sensors 110 are combined to, for example, determine which gestures have been performed by a user.

For example, when the sensors 110 are IR transmitters and receivers, in the independent mode, the detection signals from the IR receivers are used independently to detect target presence and possibly also distance and change in the distance of the target. This may involve a single pair of an IR transmitter and an IR receiver, or two or more IR receivers and transmitters, with the output of each receiver being interpreted independently. In the combination mode, the detection signals from the IR receivers are used in combination to detect touchless swipe gestures to the left, right, up, and down, and possibly other gestures, such as circular gestures.

In some embodiments, the mode pin 136 may be manipulated by a user to select a particular sub-mode within a combination mode. For example, a switch (not shown in FIG. 1) may be connected to the mode pin 136 to facilitate such control by the user. As shown in FIG. 2, the different sub-modes within a combination mode may include, for example, a slider mode, a triangle mode, and a square mode. In the slider mode, left and right touchless swiping gestures may be detected. In the triangle and square modes, up and down touchless swiping gestures may also be detected. In any of the modes and sub-modes, distance and changes in distance from the sensors 110 may be detected.

The configuration unit 140 monitors the status of the delay pin 130 to determine the delay setting. The configuration unit 140 might also monitor the state of the toggle pin 135 to determine the toggle setting. In some embodiments, the configuration unit 140 monitors the resistance value of the resistor unit 132 coupled to the delay pin 130 to determine the duration of the delay setting, and further monitors the on and off state of the switch 137 coupled to the toggle pin 135 to determine whether the toggle setting is set to on or off. The configuration unit 140 might also monitor the gesture pin 134 and the mode pin 136 to determine whether the independent or combination mode has been selected, and if the combination mode has been selected, whether the slider, triangle, or square mode has been selected.

In one embodiment, the gesture recognition unit 120 determines the touchless gestures that the detection signals received from the sensors 110 correspond to with reference to the modes determined by the configuration unit 140. For example, the gesture recognition unit 120 may determine that a touchless rightward swiping gesture has been performed using the detection signals from the sensors 110, and also by referencing the combination mode and the slider mode selected by the user as determined by the configuration unit 140. As another example, the gesture recognition unit 120 may determine that a touchless pull-up gesture has been performed by the user (i.e., a touchless gesture where the user places his or her hand over one of the sensors 110 then raises his or her hand) using the detection signals from the sensors 110, and also by referencing the independent mode selected by the user as determined by the configuration unit 140. In some embodiments, the gesture recognition unit 120 may similarly determine that a touchless pushdown gesture has been performed by the user (i.e., a gesture where the user places his or her hand over one of the sensors 110 then lowers his or her hand).

In some instances, it may be advantageous and even necessary to refer to the modes determined by the configuration unit 140. For example, in the touchless pull-up gesture example provided above, the user may inadvertently move his or hand to the left while performing the gesture. Without knowledge of the independent mode selected by the user as determined by the configuration unit 140, the gesture recognition unit 120 could erroneously identify the touchless gesture as a touchless leftward swiping gesture, rather than a touchless pull-up gesture.

In some embodiments, each gesture may correspond to one of the output pins 170. For example, a touchless rightward swiping gesture may correspond to a first output pin 170A, a touchless leftward swiping gesture to a second output pin 170B, a touchless upward gesture to a third output pin 170C, a touchless downward gesture to a fourth output pin 170D, etc. Moreover, touchless pull-up and pull-down gestures may be used when the independent mode is selected. To provide real-life examples, a touchless pull-up gesture may be used to reduce the volume of a stereo system, decrease the speed of a drill, etc., and a touchless pull-down gesture may be used to increase the volume of the stereo system, increase the speed of the drill, etc. Other scenarios are also contemplated.

In one embodiment, the memory 150 stores a gesture table 151 that associates touchless gestures, respectively, with the output pins 170, such as in the manner described above. The memory 150 may comprise a non-volatile memory. For example, the memory 150 may comprise an EEPROM ("electrically erasable programmable read-only memory"), a flash memory, or an MRAM ("magnetoresistive random access memory"). Other types of memories might also be utilized to store an association between touchless gestures and output pins 170 of the controller 100.

In one embodiment, the output controller 180 determines which output pins 170 that the determined gestures correspond to by referencing the gesture table 151 stored in the memory 150. The "determined gestures" refer to the gestures determined by the gesture recognition unit 120 to correspond to the detection signals received from the sensors 110, and potentially determined with reference to modes, as described above.

The output controller 180 subsequently controls the output pins 170 corresponding to the determined gestures. That is, the output controller 180 controls the state of the output pins 170 corresponding to the determined gestures from on (i.e. a higher voltage) to off (i.e. a lower voltage) or from off to on if the toggle setting is set to on, and on for the duration as indicated by the delay setting if the toggle setting is set to off. As described above, the delay and toggle settings may be designated by user manipulation of the delay pin 130 and the toggle pin 135, and determined by the configuration unit 140.

In some embodiments, the memory 150 also stores the delay setting indicating the duration that the output pins 170 are to be held high, and the toggle setting indicating whether the output pins 170 should be toggled. Hence, in such embodiments, the delay and toggle settings may be obtained from the memory 150 by the output controller 180, rather than from the configuration unit 140. In some embodiments, the user programs the delay and toggle settings of the output pins 170, as will be described below.

In some embodiments, the memory 150 also stores a designation of the different modes, namely, whether the independent or combination mode has been selected, and if the combination mode has been selected, whether one of the sub-modes thereof, namely, the slider, triangle, or square mode, has been selected. This may also be programmed, as will be described below.

The interface 160 is coupled to the output controller 180 and may be used by the user to program the gesture table and the delay and toggle settings in the memory 150, and subsequently change the gesture table and the delay and toggle settings. For example, the user may connect a personal computer (PC), a microcontroller, or some other external device to the interface 160, and program the gestures to be associated with the output pins 170, and subsequently alter the gesture table. Similarly, the user may connect an external device to the interface 160 and program the delay and toggle settings of the output pins 170, such that the duration that the output pins 170 are held high by control of the output controller 180 and whether the output pins 170 should be toggled by the output controller 180 can be set up by the user. The user can subsequently alter these settings in the same manner. In this case, the output controller 180 may access the gesture table and the delay and toggle settings stored in the memory 150 when controlling the output pins 170.

In some embodiments, a setting flag value is set to a predetermined value when the user programs the delay and toggle settings of the output pins 170, and the output controller 180 uses the programmed delay and toggle settings after checking that the setting flag value is set to the predetermined value. In some embodiments, the user may subsequently change the setting flag value back to its original value so that the output controller 180 uses the delay and toggle settings of the output pins 170 as determined by the configuration unit 140.

In a similar manner, the interface 160 may be used by a user to program the modes and sub-modes of the touchless controller 100. For example, a user might designate whether the independent or combination mode has been selected, and if the combination mode has been selected, whether the slider, triangle, or square mode has been selected. Moreover, a mode flag value is set to a predetermined value when the user has programmed the modes, and the gesture recognition unit 120 uses the programmed modes after checking that the mode flag value is set to the predetermined value, rather than the modes as determined by the configuration unit 140. In some embodiments, the user may subsequently change the mode flag value back to its original value so that the output controller 180 uses the modes as determined by the configuration unit 140.

The interface 160 may comprise an I$^2$C ("inter-integrated circuit") interface, a UART ("universal asynchronous receiver/transmitter") interface, a USB ("universal serial bus") interface, an SCI ("scalable coherent interface"), or another type of suitable wired or wireless communications interface. Communication with an external device may occur through a wired connection, or may occur wirelessly using, for example, radio frequency, microwave, or infrared short-range communication.

It should be appreciated that the controller 100 might not include all of the components shown in FIG. 1. For instance, in some embodiments, any one or all of the delay pin 130, the toggle pin 135, the gesture pin 134, and the mode pin 136 may be dispensed from the configuration of the touch controller 100, and the settings associated therewith may be programmed by the user as described above.

A summary of the overall operation of the touch controller 100 will now be provided. In particular, the sensors 110 detect the presence of a target and generate detection signals in response thereto. Next, the gesture recognition unit 120 determines the gestures that the detection signals received from the sensors 110 correspond to, potentially referring to the modes either determined by the configuration unit 140 or stored in the memory 150.

The output controller 180 then determines the output pins 170 that the determined gestures correspond to by referencing the gesture table 151 stored in the memory 150. Finally, the output controller 180 controls the state of the output pins 170 corresponding to the determined gestures. That is, the output controller 180 controls the output pins 170 corresponding to the determined gestures from on to off or from off to on if the toggle setting is set to on, and on for the duration as indicated by the delay setting if the toggle setting is set to off. The toggle setting and the delay setting may be determined by the configuration unit 140 or may be programmed by the user and stored in the memory 150.

Programming the touch controller 100 through the interface 160 as mentioned above will now be described more particularly. In some embodiments, the output controller 180 changes or initially establishes the gesture table 151 stored in the memory 150 in response to receiving a corresponding gesture table command from the external device through the interface 160. For example, a user may connect an external device to the interface 160, and using a software application running on the external device, generate a gesture table command to establish the gesture table 151 stored in the memory 150 or to alter the gesture table 151 already stored in the memory 150. The gesture table command may comprise signals generated by the external device in response to the user selecting gestures associated with the output pins 170, in which the gestures may be selected from various drop-down menus generated by the software application.

Moreover, in some embodiments, the output controller 180 initially stores or alters in the memory 150 the delay setting indicating the duration that the output pins 170 are to be held high, in response to receiving a corresponding delay setting command from the external device through the interface 160. Also, in some embodiments, the output controller 180 initially stores or alters in the memory 150 the toggle setting indicating whether the output pins should be toggled, in response to receiving a corresponding toggle setting command from the external device through the interface 160.

For example, a user may connect an external device to the interface 160, and using a software application running on the external device, generate a delay setting command and a toggle setting command, which are subsequently sent to the output controller 180 through the interface 160. The output controller 180 subsequently stores corresponding delay and toggle settings in the memory 150. The output controller 180 then controls the output pins 170 corresponding to the determined gestures with reference to the delay setting and the toggle setting in the memory 150.

In some embodiments, a user may connect an external device to the interface, and using a software application running on the external device, generate mode commands to designate whether the independent or combination mode has been selected, and if the combination mode has been selected, whether the slider, triangle, or square mode has been selected. The output controller 180 subsequently stores the corresponding modes in the memory 150.

In some embodiments, the touch controller 100 further comprises a reset button 185 coupled to the output controller 180. The user may press the reset button 185 then proceed to input gestures over the sensors 110. The gestures are recognized by the gesture recognition unit 120. In response, the output controller 180 assigns the gestures respectively to the output pins 170. Through such an operation, the gesture table 151 stored in the memory 150 can be configured or reconfigured.

In some embodiments, the touch controller 100 further comprises an ambient light pin 190 to which a photodetector 195 is connected. The photodetector 195 detects the amount of light and generates corresponding ambient light signals. The gesture recognition unit 120 determines the degree of ambient light using the ambient light signals. The gesture recognition unit 120 then determines which gestures that the detection signals received from the sensors 110 correspond to with reference to the modes determined by the configuration unit 140, as described above, and further with reference to the ambient light signals from the photodetector 195.

For example, in determining that a touchless pull-up gesture has been performed by the user, the gesture recognition unit 120 may determine the degree of relative change in distance of the hand of a user, i.e., the user may place his or her hand over a sensor 110 and pull his or her hand upward from this initial distance. Using information of the ambient light conditions, the gesture recognition unit 120 may be able to better determine the change in distance of the target. For example, if the gesture recognition unit 120 determines that there is a high degree of ambient light, then the gesture recognition unit 120 may reduce the values of the detection signals received from the sensors 110 to compensate for the high ambient light. As a result, the determination of the change in proximity for the touchless pull-up gesture may be more accurately performed by the gesture recognition unit 120. In some embodiments, a predetermined equation is used by the gesture recognition unit 120 that takes into account ambient light conditions as detected by the photodetector 195.

Figure 3:
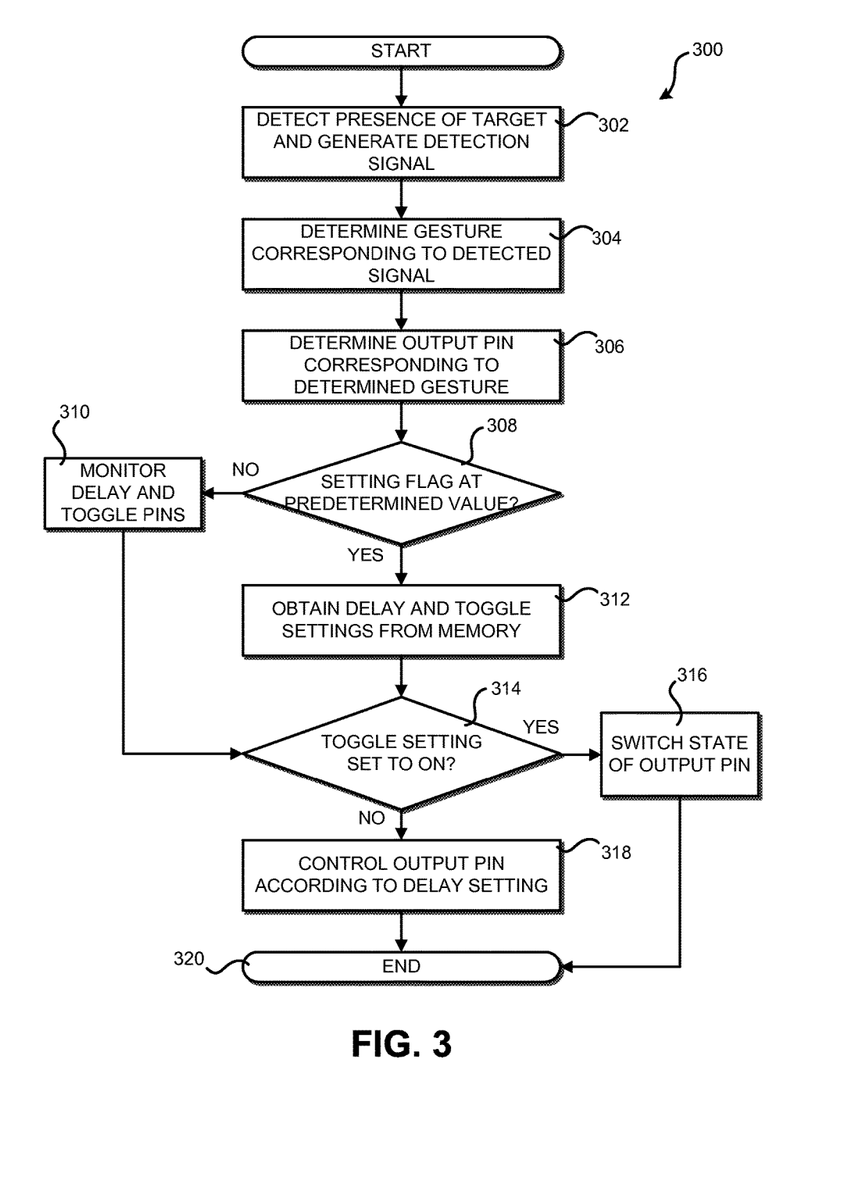
FIG. 3 is a flow diagram showing one illustrative routine for controlling the operation of a touchless controller, according to one embodiment disclosed herein.

FIG. 3 is a flow diagram showing a routine 300 that illustrates aspects of one method of operation for a touchless controller 100 with configurable output pins 170A-170N corresponding to touchless gestures, according to one embodiment disclosed herein. The logical operations of the various implementations presented herein are implemented (1) as a sequence of computer implemented acts or program modules running on a computing system and/or (2) as interconnected machine logic circuits or circuit modules within the touch controller 100. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth below.

The routine 300 begins at operation 302, where presence of a target is detected and a corresponding detection signal is generated. From operation 302, the routine 300 continues to operation 304, where the gesture that corresponds to the detection signal is determined with reference to the mode determined by the configuration unit 140. In some embodiments, the gesture that corresponds to the detection signal is determined with reference to the mode stored in the memory 150.

From operation 304, the routine 300 continues to operation 306, where the output pin 170 that corresponds to the determined gesture is determined by referencing the gesture table stored in the memory 150. From operation 306, the routine 300 continues to operation 308, where a determination is made as to whether the setting flag value in the memory 150 is set to the predetermined value. As described above, the setting flag value indicates that the user has programmed the delay and toggle settings when set to the predetermined value, and may also indicate that the user desires to use the programmed delay and toggle settings (since the setting flag value may be changed by the user).

If, at operation 308, the setting flag value is not set to the predetermined value, the routine 300 branches to operation 310, where the delay pin 130 is monitored to determine the delay setting and the toggle pin 135 is monitored to determine the toggle setting. If, at operation 308, the setting flag value is set to the predetermined value, the routine 300 continues to operation 312, where the delay setting and the toggle setting are obtained from the memory 150.

From each of operation 310 and 312, the routine 300 continues to operation 314, where a determination is made as to whether the toggle setting is set to on. If the toggle setting is set to on, the routine 300 branches to operation 316, where the state of the output pin 170 corresponding to the determined gesture is switched either from off to on or from on to off. If, at operation 314, the toggle setting is set to off, the routine 300 continues to operation 318, where the output pin 170 corresponding to the determined gesture is controlled on for the duration as indicated by the delay setting. From operations 316 and 318, the routine 300 proceeds to operation 320, where it ends.

It should be appreciated that, in some embodiments, the determination of the toggle setting may be performed prior to the determination as to whether the setting flag value is set to the predetermined value. In this case, if the toggle setting is set to on, the output pin 170 corresponding to the determined gesture is toggled, and checking of the setting flag value need not be performed.

With respect to programming described above, it should be appreciated that, in some embodiments, the interface 160 may be coupled directly to the memory 150, so that the user is able to program the gesture table and the delay and toggle settings, etc. directly without requiring control by the output controller 180. Moreover, it should be appreciated that any combination of the gesture recognition unit 120, the configuration unit 140, and the output controller 180 may form a part of a central processor of the touch controller 100, rather than being separate elements. Such a central processor could perform the operations of the gesture recognition unit 120, the configuration unit 140, and the output controller 180, as described above. Other hardware configurations might also be utilized.

Figure 4:
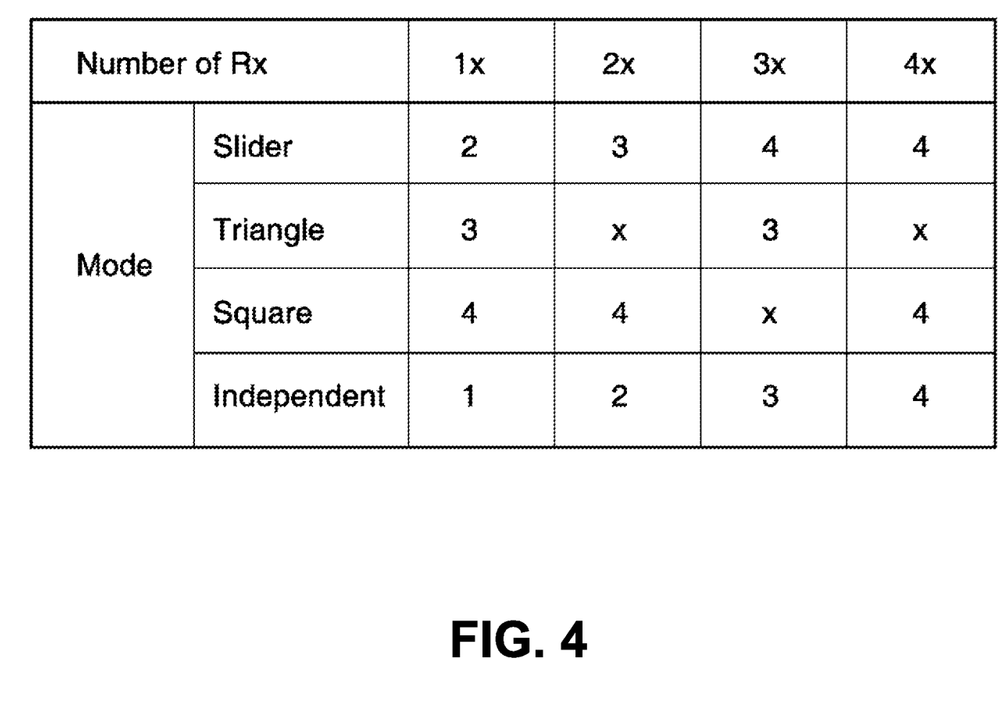
FIG. 4 is a table showing a transmitter table utilized in one embodiment for determining a number of transmitters from a number of receivers and from a mode, according to one embodiment disclosed herein.

In embodiments where the sensors 110 comprise transmitters and receivers, the gesture recognition unit 120 may determine the number of transmitters (Tx) from the number of receivers (Rx), the mode (independent or combination, or the sub-mode when combination is selected), and a transmitter table which may be stored in the memory 150. An example of a transmitter table is shown in FIG. 4.

Assuming that a user connects all non-used receivers to ground, detecting the number of receivers by the gesture recognition unit 120 is a relatively straightforward task. Next, after the number of receivers is known, the number of transmitters may be determined from the mode and from the transmitter table. Such a determination may be useful since unused transmitters or transmitters that are not present need not be driven.

In some embodiments, the arrangement of the receivers and transmitters, such as the arrangements shown in FIG. 2, may be determined from knowing the number of receivers, the mode, and the transmitter table. For example, the table of FIG. 2 may be stored in the memory 150, and by knowing the number of receivers and transmitters, as well as the mode, the arrangement may be determined from the table of FIG. 2.

As mentioned above, some of the functionality disclosed herein might be performed by executing instructions on a general or specific-purpose processor. In order to provide such functionality, instructions for performing the various processes disclosed herein might be encoded on a computer-readable storage medium for execution by a processor, such as the memory 150. It should be appreciated by those skilled in the art that computer-readable storage media can be any available media that provides for the storage of non-transitory data and that may be accessed by a processor.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Based on the foregoing, it should be appreciated that technologies have been described herein for a controller with configurable output pins corresponding to touchless gestures. Although the embodiments described herein have been described in language specific to hardware structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A controller comprising:
    a plurality of output pins;
    a memory storing a gesture table that associates touchless gestures with the output pins, wherein individual gestures are associated with one or more of the output pins;
    a proximity sensor that detects the presence of a target in proximity thereto, and generates a corresponding detection signal, the proximity sensor comprising infrared (IR) transmitter and receiver sensors;

a photodetector that detects ambient light and generates a corresponding ambient light signal;

a gesture recognition unit configured to determine a touchless gesture corresponding to a reduced value of the detection signal based on the corresponding ambient light signal; and an output controller coupled to an output of the gesture recognition unit and to the output pins, the output controller configured to determine an output pin that the determined touchless gesture corresponds to by referencing the gesture table stored in the memory, and to control a state of the output pin corresponding to the determined touchless gesture, wherein the gesture recognition unit is further configured to determine the reduced value of the detection signal received from the proximity sensor based at least in part upon the corresponding ambient light signal received from the photodetector, wherein the gesture recognition unit determines one of a pull-up gesture or a push-down gesture when an independent mode has been selected based upon the reduced value of the detection signal.

2. The controller of claim 1, wherein the memory further stores a delay setting indicating a duration that the output pins are to be held high and a toggle setting indicating whether the output pins should be toggled, and wherein the output controller is further configured to control the output pin corresponding to the determined touchless gesture from an on state to an off state or from an off state to an on state if the toggle setting is set to on, and on for a duration indicated by the delay setting if the toggle setting is set to off.

3. The controller of claim 1, further comprising:

a delay pin that designates a delay setting indicating a duration that the output pins are to be held high;

a toggle pin that designates a toggle setting indicating whether the output pins should be toggled; and a configuration unit configured to monitor the delay pin to determine the delay setting and the toggle pin to determine the toggle setting, wherein the output controller is further configured to control the output pin corresponding to the determined gesture from on to off or from off to on if the toggle setting is set to on, and on for the duration as indicated by the delay setting if the toggle setting is set to off.

4. The controller of claim 3, further comprising:

a resistor unit coupled to the delay pin and which may be varied in resistance value to designate the delay setting; and a switch coupled to the toggle pin and which may be turned on and off to designate the toggle setting, and wherein the configuration unit is further configured to monitor the resistance value of the resistor unit coupled to the delay pin to determine the duration of the delay setting, and to monitor the on and off state of the switch coupled to the toggle pin to determine whether the toggle setting is set to on or off.

5. The controller of claim 1, further comprising an interface coupled to the output controller to which an external device may be connected, wherein the output controller is further configured to change or initially establish the gesture table stored in the memory in response to receiving a corresponding gesture table command from the external device through the interface.

6. The controller of claim 5, wherein the output controller is further configured to initially store or alter in the memory a delay setting indicating a duration that the output pins are to be held high in response to receiving a corresponding delay setting command from the external device through the interface and initially store or alter in the memory a toggle setting indicating whether the output pins should be toggled in response to receiving a corresponding toggle setting command from the external device through the interface, and to control the output pin corresponding to the determined touchless gesture with reference to the delay setting and the toggle setting in the memory.

7. The controller of claim 1, wherein the proximity sensor comprises at least one of at least one IR (infrared) receiver and at least one IR transmitter proximate to one another, at least one IR receiver and at least two IR transmitters disposed in a slider arrangement, at least one IR receiver and at least three IR transmitters disposed in a triangle arrangement, and at least one IR receiver and at least four IR transmitters disposed in a square arrangement.

8. The controller of claim 7, further comprising:

a gesture pin which may be set by a user to select the independent mode or a combination mode of the proximity sensor, wherein an IR signal from each IR receiver is used independently by the gesture recognition unit when the independent mode is selected and IR signals from all the IR receivers are used in combination by the gesture recognition unit when the combination mode is selected;

a mode pin which may be set by the user to designate a particular sub-mode within the combination mode, wherein the sub-modes comprise modes corresponding to the slider arrangement, the triangle arrangement, and the square arrangement; and a configuration unit configured to monitor the gesture pin to determine whether the independent mode or the combination mode has been selected, and to monitor the mode pin to determine which particular sub-mode within the combination mode has been selected, wherein the gesture recognition unit is further configured to determine the gesture that the detection signal corresponds to with reference to the mode designated by the user, and a sub-mode within the combination mode when the combination mode has been designated by the user.

9. A method for operating a controller, the method comprising:

detecting a presence of a target in proximity to a proximity sensor of the controller and generating a corresponding detection signal, the proximity sensor comprising infrared (IR) transmitter and receiver sensors;

detecting a value of ambient light at a photodetector in communication with the controller and generating a corresponding ambient light signal;

reducing a value of the corresponding detection signal based on the corresponding ambient light signal;

determining, based at least in part on the reduced value of the corresponding detection signal, a touchless gesture as one of a pull-up gesture or a push-down gesture when an independent mode has been selected;

determining one or more output pins among a plurality of output pins that the identified touchless gesture corresponds to by referencing a gesture table stored in a memory of the touchless controller; and controlling a state of the one or more output pins corresponding to the determined touchless gesture.

10. The method of claim 9, wherein controlling the one or more output pins corresponding to the identified touchless gesture comprises controlling the one or more output pins from an on state to an off state or from an off state to an on state if a toggle setting stored in the memory is set to on, and on for a duration as indicated by a delay setting stored in the memory if the toggle setting is set to off.

11. The method of claim 9, further comprising monitoring
a delay pin, which may be set to designate a delay setting indicating a duration that the one or more output pins are to be held high, to determine the delay setting, and
a toggle pin, which may be set to designate a toggle setting indicating whether the one or more output pins should be toggled, to determine the toggle setting,
wherein controlling the one or more output pins corresponding to the determined touchless gesture comprises controlling the one or more output pins from on to off or from off to on if the toggle setting is set to on, and on for the duration as indicated by the delay setting if the toggle setting is set to off.

12. The method of claim 11, further comprising:
monitoring a resistance value of a resistor unit coupled to the delay pin to determine the duration of the delay setting; and
monitoring on and off states of a switch coupled to the toggle pin to determine whether the toggle setting is set to on or off.

13. The method of claim 9, further comprising changing or initially establishing the gesture table stored in the memory in response to receiving a corresponding gesture table command from an external device through an interface of the touchless controller.

14. The method of claim 13, further comprising:
initially storing or altering in the memory a delay setting indicating a duration that the one or more output pins are to be held high in response to receiving a corresponding delay setting command from the external device through the interface; and
initially storing or altering in the memory a toggle setting indicating whether the one or more output pins should be toggled in response to receiving a corresponding toggle setting command from the external device through the interface,
wherein controlling the output pin corresponding to the determined touchless gesture comprises controlling the one or more output pins with reference to the delay setting and the toggle setting in the memory.

15. The method of claim 9, wherein the proximity sensor comprises one of
at least one IR (infrared) receiver and at least one IR transmitter disposed in proximity to one another,
at least one IR receiver and at least two IR transmitters disposed in a slider arrangement,
at least one IR receiver and at least three IR transmitters disposed in a triangle arrangement, and
at least one IR receiver and at least four IR transmitters disposed in a square arrangement, and
wherein the method further comprises:
monitoring a gesture pin, which may be set by a user to select the independent mode or a combination mode of the proximity sensor, an IR signal from each IR receiver being used independently when the independent mode is selected and IR signals from all the IR receivers being used in combination when the combination mode is selected, to determine whether the independent mode or the combination mode has been selected; and
monitoring a mode pin, which may be set by the user to designate a particular sub-mode within the combination mode, the sub-modes comprising modes corresponding to the slider arrangement, the triangle arrangement, and the square arrangement, to determine which particular sub-mode within the combination mode has been selected,
wherein determining the touchless gesture that the detection signal corresponds to further comprises determining
the gesture with reference to the mode designated by the user, and
the particular sub-mode within the combination mode when the combination mode has been designated by the user.

16. The method of claim 9, further comprising, determining a relative change in a distance of the target with reference to the corresponding detection signal and the corresponding ambient light signal.

17. A non-transitory computer-readable storage medium having computer-readable instructions stored thereupon that, when executed by a computer, cause the computer to:
detect a presence of a target in proximity to a proximity sensor of a touchless controller and generate a corresponding detection signal;
detect a value of ambient light at a photodetector in communication with the controller and generate a corresponding ambient light signal;
reduce a value of the corresponding detection signal based on the corresponding ambient light signal;
determine, based at least in part on the reduced value of the corresponding detection signal, a touchless gesture as one of a pull-up gesture or a push-down gesture when an independent mode has been selected;
determine one or more output pins among a plurality of output pins that the determined gesture corresponds to by referencing a gesture table stored in the non-transitory computer-readable storage medium; and
control a state of the one or more output pins corresponding to the determined gesture.

18. The non-transitory computer-readable storage medium of claim 17, wherein controlling the one or more output pins corresponding to the determined gesture comprises controlling the one or more output pins from an on state to an off state or from an off state to on state if a toggle setting stored in the memory is set to on, and on for a duration as indicated by a delay setting stored in the memory if the toggle setting is set to off.

19. The non-transitory computer-readable storage medium of claim 17, further comprising computer-readable instructions which, when executed by the computer, cause the computer to monitor
a delay pin of the touchless controller, which may be set to designate a delay setting indicating a duration that the one or more output pins are to be held high, to determine the delay setting, and
a toggle pin, which may be set to designate a toggle setting indicating whether the output pins should be toggled, to determine the toggle setting,
wherein controlling the one or more output pins corresponding to the determined touchless gesture comprises controlling the one or more output pins from an on state to an off state or from an off state to an on state if the toggle setting is set to on, and on for the duration as indicated by the delay setting if the toggle setting is set to off.

20. The non-transitory computer-readable storage medium of claim 17, further comprising computer-readable instructions which, when executed by the computer, cause the computer to change or initially establish the gesture table stored in the non-transitory computer-readable storage medium in response to receiving a corresponding gesture table command from an external device through an interface.

* * * * *